(12) United States Patent
LeBlanc et al.

(10) Patent No.: US 9,091,209 B2
(45) Date of Patent: Jul. 28, 2015

(54) FOUR BAR BRACKET

(75) Inventors: Ryan Edward LeBlanc, Glastonbury, CT (US); Kevin J. Cummings, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 642 days.

(21) Appl. No.: 13/527,744

(22) Filed: Jun. 20, 2012

(65) Prior Publication Data
US 2013/0340555 A1 Dec. 26, 2013

(51) Int. Cl.
*F02C 9/18* (2006.01)

(52) U.S. Cl.
CPC ............... *F02C 9/18* (2013.01); *F05D 2260/50* (2013.01); *Y10T 74/20* (2015.01)

(58) Field of Classification Search
CPC ..... F02C 9/18; F04D 27/002; F04D 27/0246; Y10T 74/20; F05D 2260/50; B64D 27/10; B64D 2027/262; B64D 2027/268
USPC .......................................... 248/554, 555, 675
See application file for complete search history.

(56) References Cited

U.S. PATENT DOCUMENTS

| | | | |
|---|---|---|---|
| 1,220,729 A * | 3/1917 | Clark et al. .................... | 137/346 |
| 2,998,991 A | 9/1961 | Spencer | |
| 3,638,428 A | 2/1972 | Shipley et al. | |
| 3,943,707 A | 3/1976 | Nash | |
| 3,960,343 A | 6/1976 | Thompson | |
| 3,999,930 A | 12/1976 | Telbizoff | |
| 4,403,912 A | 9/1983 | Pekari et al. | |
| 4,698,964 A | 10/1987 | Glancy | |
| 4,761,917 A | 8/1988 | Knecht et al. | |
| 4,854,994 A | 8/1989 | Breiter et al. | |
| 4,925,151 A | 5/1990 | Gray | |
| 5,050,803 A | 9/1991 | Wakeman et al. | |
| 5,549,448 A | 8/1996 | Langston | |
| 5,899,463 A | 5/1999 | Koch | |
| 6,161,839 A | 12/2000 | Walton et al. | |
| 6,742,324 B2 | 6/2004 | Bachelder et al. | |
| 6,802,691 B2 | 10/2004 | Chlus | |
| 6,935,836 B2 | 8/2005 | Ress, Jr. et al. | |
| 6,968,697 B2 | 11/2005 | Nguyen et al. | |
| 7,025,563 B2 | 4/2006 | Servadio et al. | |
| 7,090,462 B2 | 8/2006 | Martin et al. | |
| 7,607,308 B2 | 10/2009 | Kraft et al. | |
| 7,780,174 B2 | 8/2010 | Wunderlich et al. | |
| 7,785,066 B2 | 8/2010 | Bil et al. | |
| 7,850,419 B2 | 12/2010 | Vrljes et al. | |
| 7,857,576 B2 | 12/2010 | Durocher et al. | |
| 8,366,118 B2 | 2/2013 | Schilling | |
| 2007/0114791 A1 | 5/2007 | Williams | |
| 2009/0317229 A1 | 12/2009 | Suciu et al. | |

(Continued)

OTHER PUBLICATIONS

International Search Report and Written Opinion for International Application No. PCT/US2013/046046 completed on Aug. 30, 2013.

(Continued)

*Primary Examiner* — Edward Look
*Assistant Examiner* — Aaron R Eastman
(74) *Attorney, Agent, or Firm* — Carlson, Gaskey & Olds, PC

(57) ABSTRACT

A bracket for use with a four bar linkage, has a head portion having a triangular shape, and a shank extending from a corner of the triangular head portion, the shank thickening depthwise and narrowing widthwise along its length.

14 Claims, 6 Drawing Sheets

(56) References Cited

U.S. PATENT DOCUMENTS

2010/0047059 A1    2/2010   Gentils et al.
2010/0247306 A1    9/2010   Merry et al.
2010/0278639 A1   11/2010   Hood et al.

OTHER PUBLICATIONS

International Preliminary Report on Patentability for International Application No. PCT/US2013/046046 mailed Dec. 31, 2014.

* cited by examiner

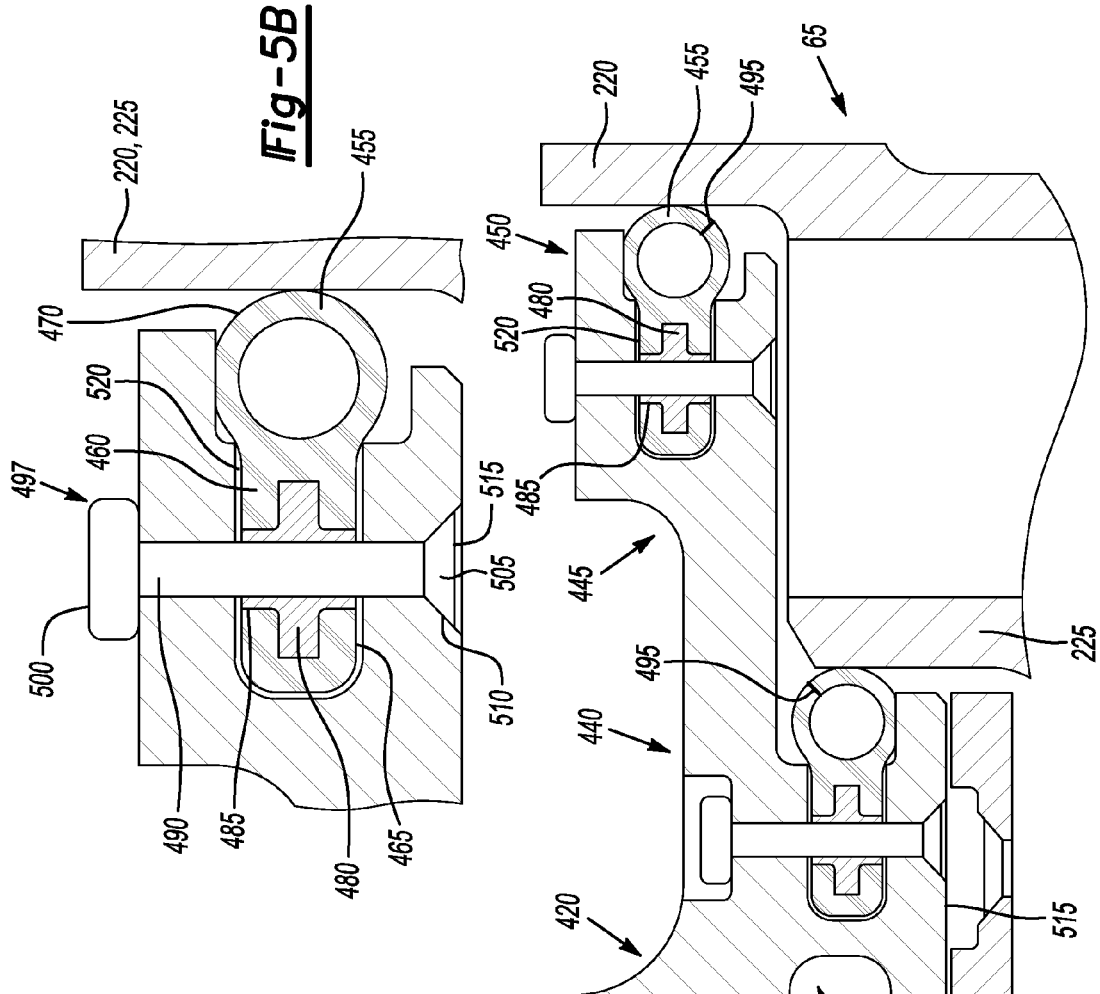

FOUR BAR BRACKET

BACKGROUND

Gas turbine engines include one or more compressors for pressurizing a working medium fluid, typically ambient air, which flows through a longitudinally extending compressor flow path. Under some operating conditions, it is desirable to temporarily moderate the pressure at the discharge end of the compressor to prevent or recover from compressor stall or other aerodynamic instabilities. Pressure moderation is usually effected by opening a compressor bleed valve that diverts a portion of the pressurized fluid from the discharge end of the compressor flow path into a lower pressure region.

An exemplary compressor bleed valve system includes a moveable full hoop valve ring with a pair of ring seal members radially aligned with the bleed duct case seal seats. The compressor bleed valve includes a ring having a pair of resilient seal members adhesively bonded or clamped into respective channels on longitudinally facing surfaces of the ring. A series of circumferentially distributed passages extend through the bleed duct case to join the compressor flow path to a surrounding annular chamber. A set of pins extends radially from the valve ring, and each pin includes a roller that engages a carved slot on the orifice ring. A bell crank for operating the valve ring is mounted on a bell crank support bracket by a bell crank pivot. Input and output arrays of the bell crank are connected respectively to an actuator and to the valve ring.

In operation, the actuator rotates the bell crank about the bell crank pivot so that the bell crank, in turn, drives the valve ring in a spiral motion, positioning the sleeve to cover or uncover the passages. The rollers help guide the valve ring in its spiral path. As the valve ring approaches its fully closed position, the seal members contact the seal seats, compressing them in the longitudinal direction to affect a fluid tight seal.

SUMMARY

According to an exemplary embodiment disclosed herein, a bracket for use with a four bar linkage, has a head portion having a triangular shape, and a shank extending from a corner of the triangular head portion, the shank thickening depthwise and narrowing widthwise along its length.

In another embodiment according to the previous embodiment, a t-shaped piece attaches to an end of the shank distal from the head portion.

In another embodiment according to the previous embodiment, the t-shaped piece attaches to a bell crank assembly.

In another embodiment according to the previous embodiment, shims are disposed between the t-shaped piece and the bell crank assembly to minimize tolerance gaps during assembly.

According to a further exemplary embodiment disclosed herein, a linkage for actuating a seal, the linkage has a first bell crank assembly, a second bell crank assembly, a first connecting link connecting the first bell crank assembly to the second bell crank assembly such that motion of the first bell crank assembly effects motion of the second bell crank assembly, and a bracket attaching the a first bell crank assembly to the second bell crank assembly.

In another embodiment according to the previous embodiment, the first bell crank assembly has crank having a first arm and a second arm, wherein the first arm is above the second arm.

In another embodiment according to the previous embodiment, a duct casing to which a bracket of the first bell crank is mounted is provided.

In another embodiment according to the previous embodiment, the bracket is attached to the first bell crank by a flexible web.

In another embodiment according to the previous embodiment, the duct casing has a mounting pin thereon that locates the bracket thereon.

In another embodiment according to the previous embodiment, the duct casing has a radially outwardly extending flange, the first bell crank assembly has crank having a first arm above the flange, and a second arm, wherein the first arm is above the second arm wherein motive force applied to the second arm rotates the first arm above the flange.

In another embodiment according to the previous embodiment, a second connecting link attaches to the second arm.

In another embodiment according to the previous embodiment, the second bell crank has a mounting surface thereon for attaching the bracket thereto.

In another embodiment according to the previous embodiment, the bracket has a head portion having a triangular shape, and a shank extending from a corner of the triangular head portion, the shank thickening depthwise and narrowing widthwise along its length.

In another embodiment according to the previous embodiment, the head portion has a hole for receiving a locator pin extending from the second bellcrank assembly.

According to a still further exemplary embodiment, a linkage for actuating a seal in a gas turbine engine, includes a first bell crank assembly, a second bell crank assembly, a first connecting link connecting the first bell crank assembly to the second bell crank assembly such that motion of the first bell crank assembly effects motion of the second bell crank assembly, and a bracket attaching the a first bell crank assembly to the second bell crank assembly.

In another embodiment according to the previous embodiment, the first bell crank assembly has crank having a first arm and a second arm, wherein the first arm is above the second arm.

In another embodiment according to the previous embodiment, the bracket is attached to the first bell crank by a flexible web.

In another embodiment according to the previous embodiment, the engine has a radially outwardly extending flange, the first bell crank assembly has crank having a first arm above the flange, and a second arm, wherein the first arm is above the second arm and wherein motive force applied to the second arm rotates the first arm above the flange.

In another embodiment according to the previous embodiment, the second bell crank has a mounting surface thereon for attaching the bracket thereto.

In another embodiment according to the previous embodiment, the bracket has a head portion having a triangular shape, and a shank extending from a corner of the triangular head portion, the shank thickening depthwise and narrowing widthwise along its length.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 5A is a side view cutaway of the valve assembly of FIG. 1.

FIG. 5B is a side view cutaway of a bulb seal of FIG. 5B.

DETAILED DESCRIPTION

Figure 1:
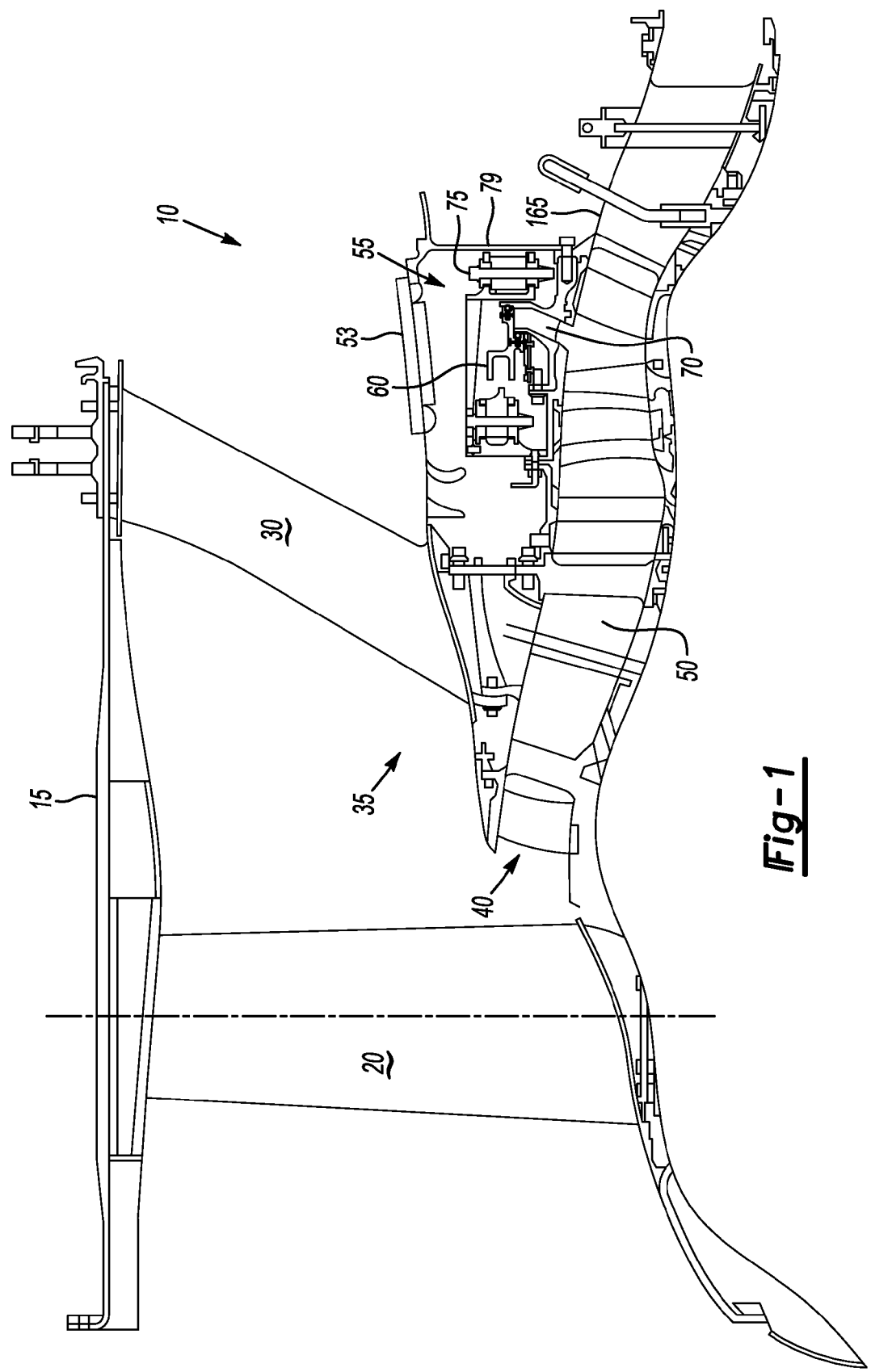
FIG. 1 is a cross-section of a portion of a gas turbine engine.

Referring now to FIG. 1, an engine 10, such as a gas turbine engine is shown. The engine 10 has a nacelle 15 that extends around blades 20. The blades 20 are attached to a shaft (not shown) passing through the core 25 of the engine 10. The core 25 is held in place by struts 30. The blades 20 provide a first airflow 35 between the core 25 and the nacelle 15, and a second airflow 40 passing through compressor section 45 in the core 25. The core is enclosed by a core casing 53. A bleed assembly 55 is disposed between the core casing 53 and the compressor section 45. The bleed assembly 55 (shown within lines 2-2) includes a ring-shaped bleed valve 60, a ring-shaped bleed duct assembly 65 that acts as a portion of an compressor section outer wall, bleed ducts 70 passing through the bleed duct assembly 65, a linkage assembly 75. A firewall 79 is disposed next to the bleed assembly 55.

Figure 2:
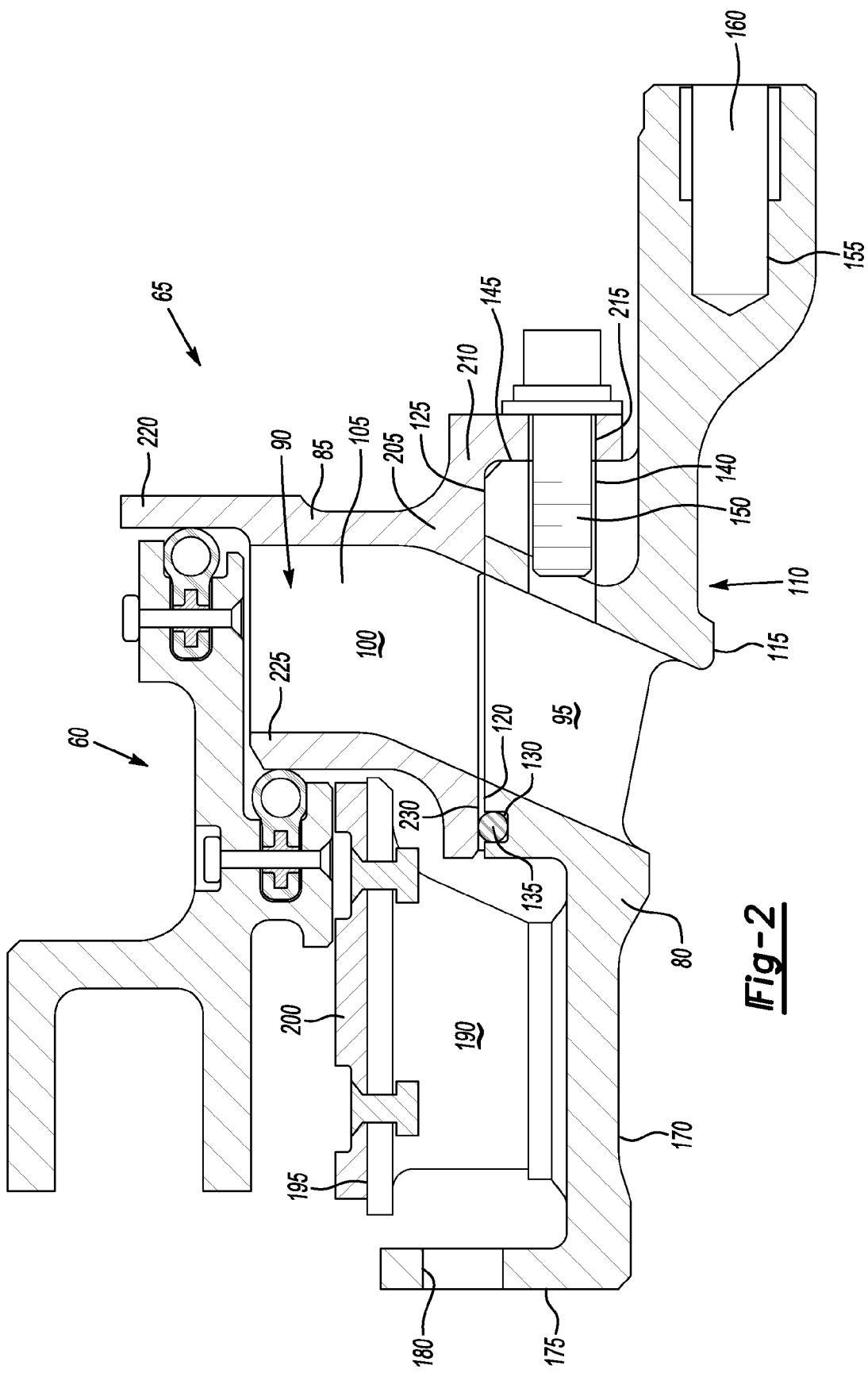
FIG. 2 is a portion of the gas turbine engine taken along the lines 2-2 in FIG. 1.

Referring now to FIG. 2, the details of the bleed duct assembly 65 are shown. The bleed duct assembly 65 has an inner case 80, which is either forged or cast, load-bearing, high-temperature resistant material such as titanium or the like (including a ceramic), and an outer case 85, which bears less load and stress may be made of lower strength, lighter metal such as aluminum. A duct 90, which has a first portion 95 in the inner case 80, and a second portion 100 in the outer case 85 is separated circumferentially by ligaments such as airfoils 105 between adjacent circumferential ducts 90.

The inner casing 80 has a body 110 having a central area 115 having a first land 120 on a top portion 125 of the body 110. The top portion 125 has a groove 130 in which an o-ring 135 is disposed to act as a seal to minimize air from escaping between the duct portions 95, 100. Bolt hole 140 is disposed in a side portion 145 of the body 110 for attaching the outer case 85 to the inner case 80 by means of a bolt 150. The inner casing 80 has an aft extension 155 having an axial attachment hole 160 to attach to an adjacent core segment 165 (see FIG. 1). The body 110 also has a fore extension 170 having a flange 175 extending radially outwardly therefrom. The flange 175 has an opening 180 for attaching to another adjacent core segment 185 (see FIG. 1).

On a radially outer surface of the body 110, a platform 190, which supports the bleed valve 60, is disposed thereon. There are a plurality of platforms disposed circumferentially about the body 110 to support the valve 60. The platform has a cylindrical top 195 that has a flat cross-section and is covered by a low wear material 200 that is somewhat lubricious to allow the bleed valve 60 to slide thereon without snagging.

The outer case 85 has a body 205 having an aft flange 210 depending radially inwardly from the body 205. The aft flange 210 has a hole 215 aligning with bolt hole 140 through which bolt 150 extends into the bolt hole 140 to attach the outer case 85 to the inner case 80. The outer case body 205 has a flange 220 extending radially outward to mate with the bleed valve 60 as will be discussed infra. The body 205 also has a fore side 225 that mates with the bleed valve 60 as will be discussed infra. The body 205 has a second land 230 that mates with the first land 120 when the bolt 150 is inserted into hole 140. When the bolt 150 is tightened, the first land 120 and the second land 230 secure the O-ring 135 to minimize any air leakage between the bolts. The o-ring 135 gets compressed when the case halves are installed.

The airfoils 100, or ligaments disposed between ducts 90 are shaped to shape direct the flow of air flowing through the duct 90 to enhance flow with minimal losses therethrough so that the air siphoned from the compressor section 45 may be used efficiency downstream of the ducts 90. The outer case 85 is aluminum to allow more complex flow patterns of the duct second portion 100 to be machined or formed to maximize efficiency of the air flowing therethrough. The first portion 95 in the inner case 80 and the second portion 100 in the outer case 85 are smoothed to minimize losses. Furthermore, the outer case 85 is made of aluminum or the like to save weight and the inner case is made of titanium to improve the capability of the bleed duct assembly 65 to handle engine backbone loads. Because the inner case handles the backbone loads, the outer case 85 may be made of aluminum where weight may be saved. Because the outer case 85 is cast more shaped airfoils may be used to reduce aerodynamic losses and reduce backflow upon the compressor section 45.

A user would choose a first material as an inner case 80 to withstand the backbone loads of the engine 10, then choose a lighter material as an outer case 85 to form a lighter bleed duct assembly 65. The user would then form the duct 90 for instance by casting the outer case 85 and forging the inner case 80 and then join the two segments as mentioned hereinabove.

Referring now to FIGS. 3A-C and 4A-B, the linkage assembly 75 is shown. The linkage assembly 75 has a fore bell crank assembly 235, an aft bell crank assembly 240, a fore connecting link 245 and a bridge arm 250.

The aft bell crank 240 has a body 255 from which brackets 260 extend circumferentially and radially inwardly therefrom. A rotation pin 265 extends through the body 255 to hold a bell crank 280. The body 255 has a flange 270 extending radially outwardly therefrom. The upper flange 270 has holes 275 passing axially therethrough for joining with the bridge arm 250. The bell crank 280 is seated within the body 255 and has an upper arm 285 for attaching to the fore connecting link 245 and a lower arm 290 disposed radially inwardly from the upper arm 285 attaching to an aft connecting link 295. The aft connecting link 295 attaches to an actuator (not shown).

The brackets 260 have a base 300 and webs 305 that attach to the aft bell crank body 255. The brackets 300 sit upon land 310 on the stationary inner case 80. A pin 315 extends radially outwardly from the land 210 for insertion into the locator hole 320 in the base 300. Bolt 323 connects the bracket 260 to the inner case 80.

The fore bell crank assembly 235 has a body 325. A pin 330 extends through clevis 335 to anchor crank 337 therein (see FIG. 3B). The body has a lower flange 340 that forms a bracket 345 having openings 350. Pin openings 355 (see FIG. 3C) are utilized to locate the bracket 345 in an adjacent core segment 165 (see FIG. 1). The body 325 has an upper surface 360 from which locator pin 365 extends. The upper surface has bolt holes 370 that secure bridge arm 250 thereto as will be discussed herein. The crank 337 has a first arm 375 attaching to the bleed valve 60 and a second arm 380 attaching to the fore connecting link 245. The second arm 380 is angularly displaced from the first arm 375 so that the bleed valve 60 moves an appropriate amount as desired to meter flow through the bleed duct assembly 65.

The bridge arm 250 has a key-like shape having a flat triangular section 390 that has openings 394 for mating with the bolt holes 370 (see FIG. 3) and an aperture 397 for mating with the pin 365 to attach the bridge arm 385 to the fore bell crank assembly. The bridge arm 250 also has a shank 395 which narrows circumferentially and expands radially from the triangular section 390. In other words, the shank gets thicker depthwise and narrower widthwise along its length. A t-shaped assembly 400 is formed by ears 405 that extend circumferentially from an end 407 of the shank 395. The ears have openings 410 through which fasteners 415 extend to mate with the holes 275 in the upper flange 270 of the aft bell crank 240. The openings 394 and aperture 397 may be oversized to allow for circumferential misalignment.

The webs 305 of the aft bell crank assembly 240 are designed to flex during thermal loading while providing stiffness for operating loads. The bridge arm 250 limits deflection of the cantilevered fore bell crank assembly 235 and aft bell crank assembly 240 and provides more stiffness to the linkage assembly 75. Shims 417 are placed between the t-section 400 and the upper flange 270 to eliminate axial tolerance gaps during assembly.

Because the area to mount the brackets 260 to the inner case 80 is limited, the required stiffness and deflection of the aft bell crank assembly 240 is provided by providing the bridge arm 250 between the aft bell crank 240 and the fore bell crank assembly 235, which is attached to the flange of the adjacent core segment 165. The bridge arm 250 is designed not to buckle or deflect during excessively unloading. The aft brackets 260 are more flexible to allow for controlled deflection of the fore bell crank assembly 235 and the aft bell crank assembly 240 caused by thermal growth of the inner case 80.

Figure 3A:
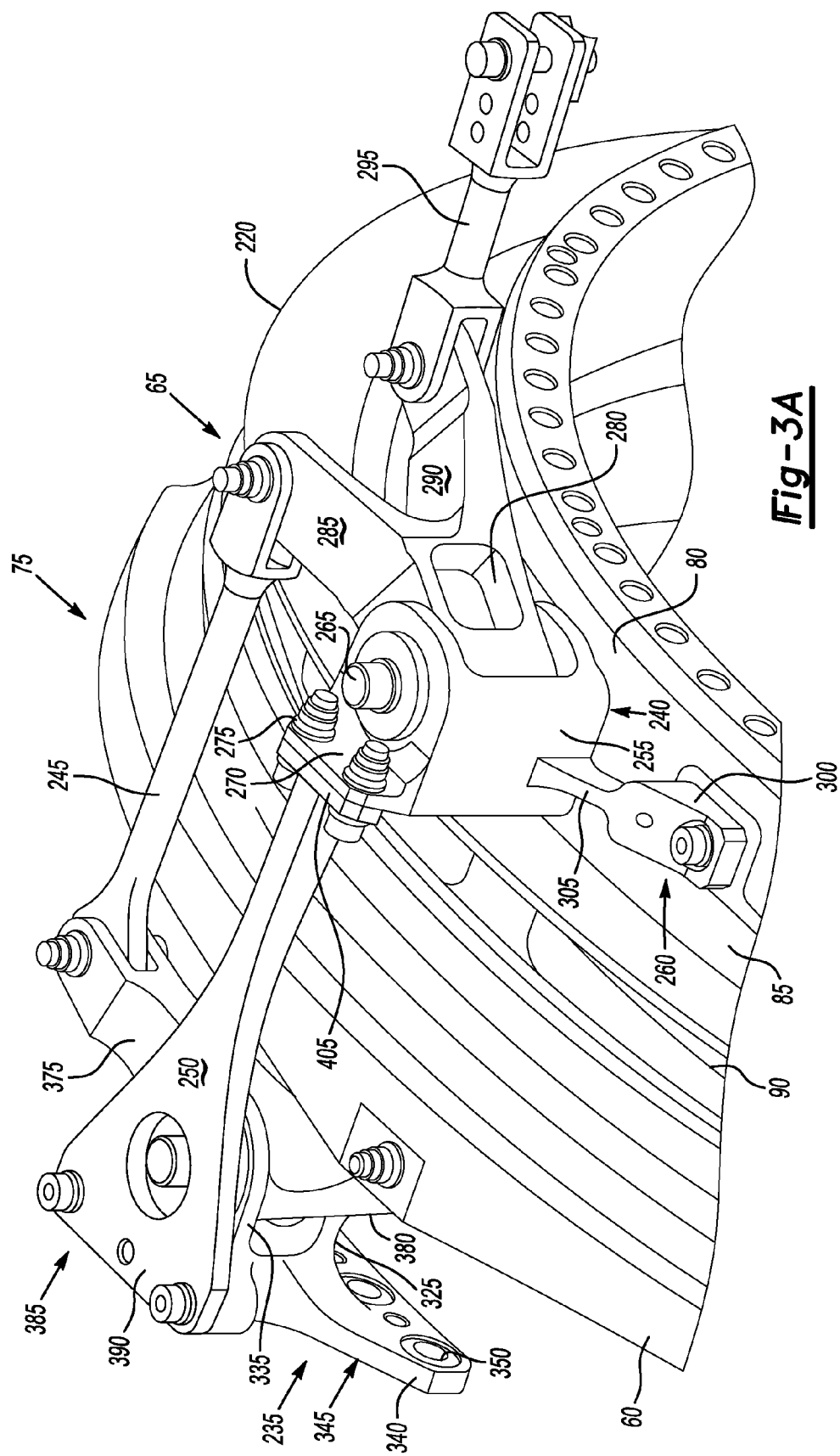
FIG. 3A is a perspective view of a bell crank for opening and closing of valves depicted in FIG. 2.
Figure 3B:
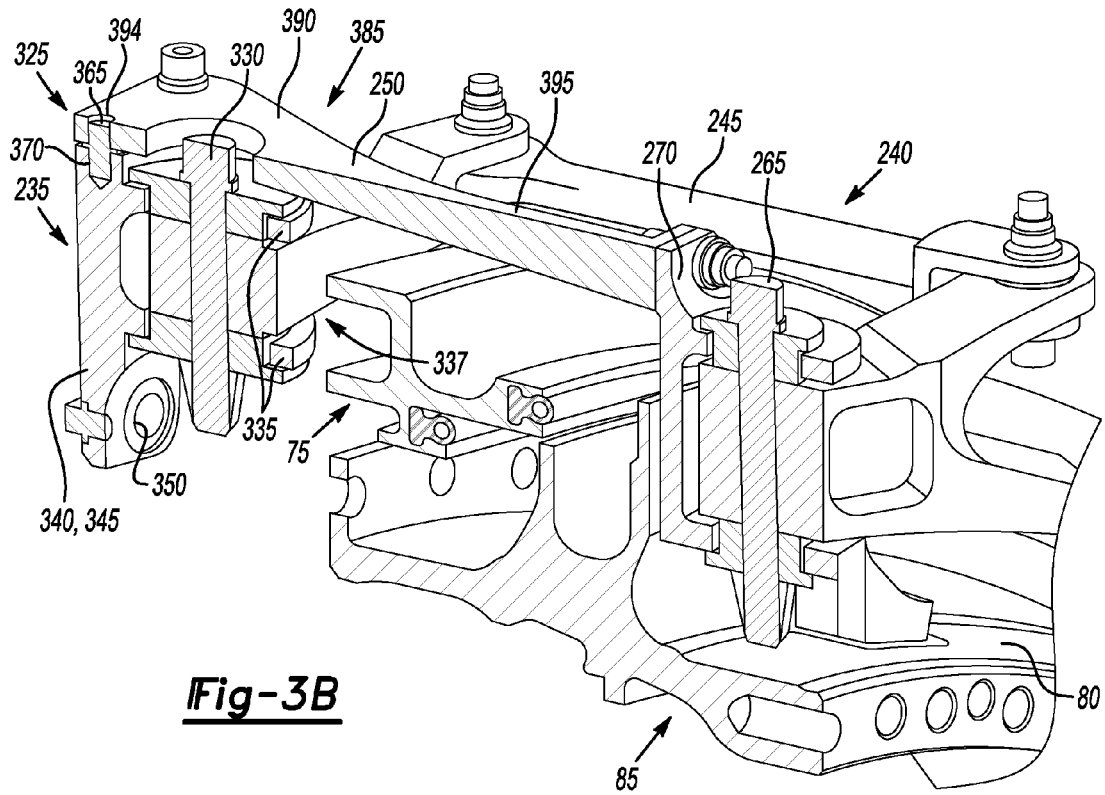
FIG. 3B is a cross-sectional view of the four bar linkage as shown in 3A.
Figure 3C:
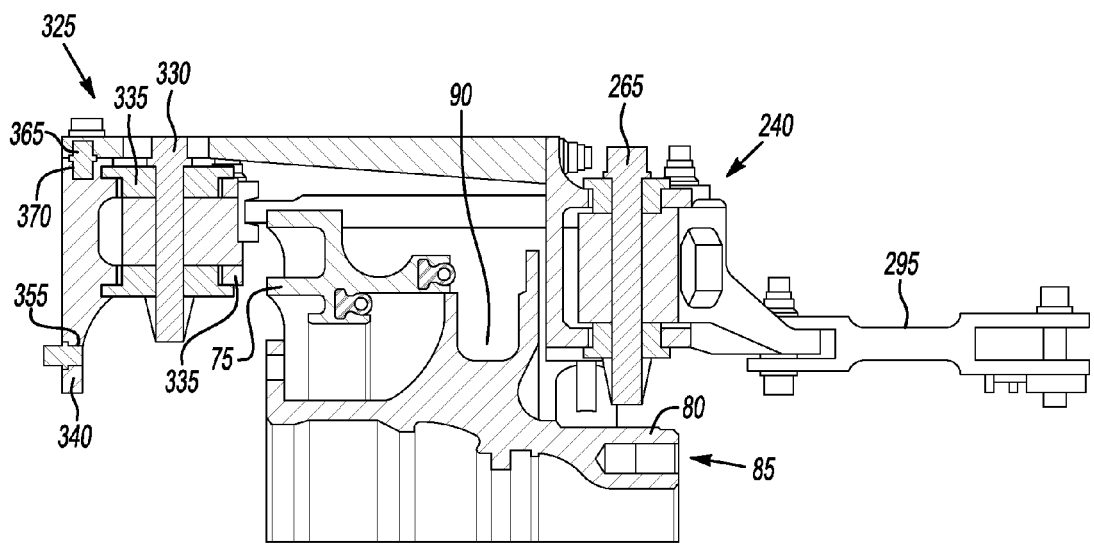
FIG. 3C is a side view cutaway of the bell crank four bar configuration of FIG. 3A.
Figure 4A:
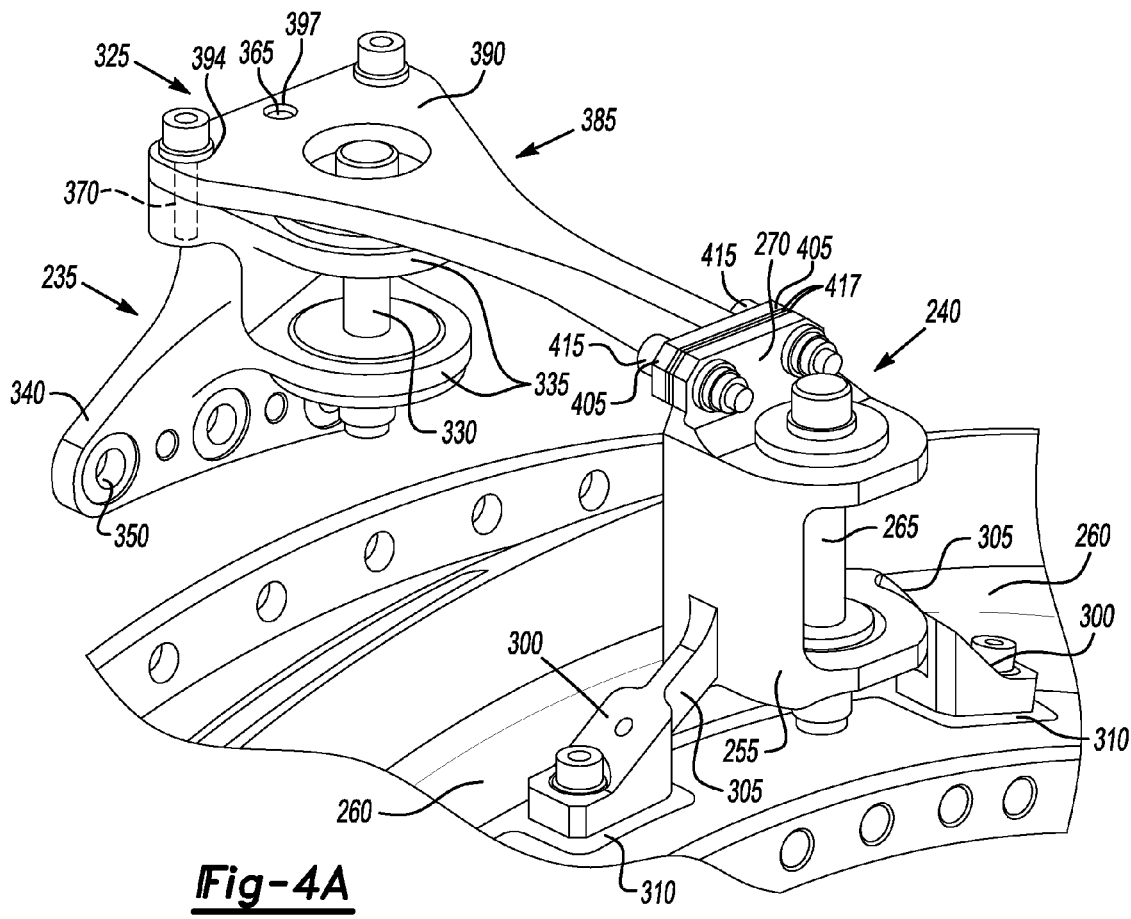
FIG. 4A is an isolated view of a portion of the four bar configuration of FIG. 3A.
Figure 4B:
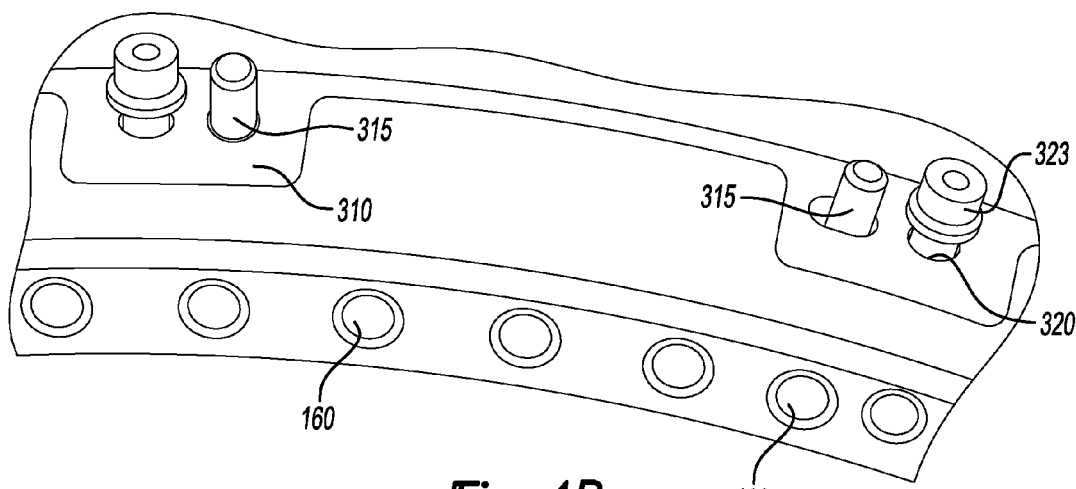
FIG. 4B is a portion of a mounting system for the bell crank of FIG. 3A.

Referring to FIGS. 4 and 3C, it can be seen that the aft connecting link 295 and the lower arm 290 (see FIG. 3A) are lower than the upper arm 285 to allow a motive force of the actuator (now shown) to move up and over the radially extending flange 220, which is used by the bleed valve 60 as will be discussed herein. The motive force rotates the bell crank 280 about pin 265, moving the fore connecting link 245 axially and rotationally. The fore connecting link 245 rotates the first arm 375 about the pin 330 thereby causing the rotation of the second arm 380 that moves the bleed valve partially axially and partially in rotation to modulate the degree of air flowing through the bleed duct assembly 65.

Referring now to FIGS. 5A and 5B, the bleed valve 60 is shown. The bleed valve 60 has a body 420 having a clevis section 425, a midsection 440 a forward section 430 and an aft section 450. A first seal holder 435 extends radially inwardly from the midsection 440 of the body 420. A second seal holder 445 extends from the aft section 450 of the body 420.

Referring now to FIG. 5B, a seal 455 is shown in a seal holder 435 or 445. Each seal has a cylindrically extending body 460, a flat cross-section reinforcing strip 465 extending from the extending body 460 and a bulbous section 470 attaching at one end of the body 460. Each bulbous section has an opening 475. In the first seal holder 435, the opening is adjacent and facing the pressure section of the duct 90 so that high pressure air is forced through the opening 495 to allow the bulb to expand. This expansion helps make the seal 455 more effective. Similarly the opening 495 in the second seal holder 445 is also placed so the opening 475 is exposed to the pressure extending through the duct 90 to allow it to be filled with high pressure air as well. The strip 465 extends towards the bulbous section 470

A shaft 485 extends upwardly from the flat portion 480 at periodical positions around the seal 455 to attach the seal to the seal holders 435, 445. A shank 490 of a rivet 497 (or other fastener) extends through a center of the shaft 485. The rivet 495 has a head 500, a tail 505, and a bottom 515. The bottom 515 fits within a recess 510 in each seal holder 435, 445. As can be seen in FIG. 5A, because the bottom 515 slides upon the low wear material 200, the tail 505 must be recessed so as to not damage the low wear material 200. The cylindrical body 460 fits within a groove 520 placed within each seal holder cylindrical 435, 445. There are no sharp edges within the groove 520 to avoid damaging the seal 455. The groove 520 is easy to machine relative to the prior art in which a seal is held within a groove with raised ridges extending towards each other between a cylindrical body and a bulbous section of a seal. The groove 520 presented herein is far more easily machined than in the prior art. Furthermore, because the seal 455 is riveted to the seal holders 435, 445 they are not torn out of their channels as with the prior art bonded seals. The seal is also relatively easy to replace by removing the rivets 495.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A linkage for actuating a seal, said linkage comprising:
a first bell crank assembly, wherein said first bell crank assembly has a crank having a first arm and a second arm, wherein said first arm is radially outside said second arm,
a second bell crank assembly,
a first connecting link connecting said first bell crank assembly to said second bell crank assembly such that motion of said first bell crank assembly effects motion of said second bell crank assembly, and
a bracket attaching said first bell crank assembly to said second bell crank assembly.

2. The linkage of claim 1 further comprising:
a duct casing to which a bracket of said first bell crank is mounted.

3. The linkage of claim 2 wherein said bracket is attached to said first bell crank by a flexible web.

4. The linkage of claim 2 wherein said duct casing has a mounting pin thereon that locates the bracket thereon.

5. The linkage of claim 2 further comprising:
said duct casing having a radially outwardly extending flange,
said first bell crank assembly has a crank having a first arm radially outside said flange, and
a second arm, wherein said first arm is radially outside said second arm wherein motive force applied to said second arm rotates said first arm.

6. The linkage of claim 5 further comprising a second connecting link attaching to said second arm.

7. The linkage of claim 1 further comprising:
said second bell crank having a mounting surface thereon for attaching said bracket thereto.

8. The linkage of claim 1 wherein said bracket has a head portion having a triangular shape, and a shank extending from a corner of said triangular head portion, said shank thickening depthwise and narrowing widthwise along its length.

9. The linkage of claim 8 wherein said head portion has a hole for receiving a locator pin extending from said second bellcrank assembly.

10. A linkage for actuating a seal in a gas turbine engine, said linkage comprising:
- a first bell crank assembly, wherein said first bell crank assembly has a crank having a first arm and a second arm, wherein said first arm is radially outside said second arm,
- a second bell crank assembly,
- a first connecting link connecting said first bell crank assembly to said second bell crank assembly such that motion of said first bell crank assembly effects motion of said second bell crank assembly, and a
- a bracket attaching said a first bell crank assembly to said second bell crank assembly.

11. The linkage of claim 10 wherein said bracket is attached to said first bell crank by a flexible web.

12. The linkage of claim 10 further comprising:
said engine having a radially outwardly extending flange,
said first bell crank assembly has a crank having a first arm radially outside said flange, and
a second arm, wherein said first arm is radially outside said second arm and wherein motive force applied to said second arm rotates said first arm.

13. The linkage of claim 10 further comprising:
said second bell crank having a mounting surface thereon for attaching said bracket thereto.

14. The linkage of claim 10 wherein said bracket has a head portion having a triangular shape, and a shank extending from a corner of said triangular head portion, said shank thickening depthwise and narrowing widthwise along its length.

* * * * *

UNITED STATES PATENT AND TRADEMARK OFFICE
CERTIFICATE OF CORRECTION

PATENT NO. : 9,091,209 B2  Page 1 of 1
APPLICATION NO. : 13/527744
DATED : July 28, 2015
INVENTOR(S) : Ryan Edward LeBlanc It is certified that error appears in the above-identified patent and that said Letters Patent is hereby corrected as shown below:

IN THE CLAIMS:

In claim 10, column 7, line 11; after "assembly" insert --;--

In claim 10, column 7, line 11; after "and" delete "a"

In claim 11, column 7, line 12; after "said" delete "a"

Signed and Sealed this
Twenty-fourth Day of November, 2015

Michelle K. Lee
*Director of the United States Patent and Trademark Office*